March 1, 1938. N. PHILLIPS 2,110,053

PLASTIC PLUG

Filed Jan. 2, 1936

Inventor:
Noel Phillips
by Peck & Peck
Attorneys

Patented Mar. 1, 1938

2,110,053

UNITED STATES PATENT OFFICE 2,110,053

PLASTIC PLUG

Noel Phillips, Bexleyheath, England

Application January 2, 1936, Serial No. 57,312
In Great Britain May 27, 1935

10 Claims. (Cl. 72—105)

This invention concerns improvements in or relating to the plugging of walls and the like to provide a hold for screws, nails and other securing means. It comprises, first, a mixture of materials adapted, when moistened, to form a coherent plastic mass capable of subsequently hardening to a solid mass, the plastic mass being well adapted to be rolled between the hands into the form of a plastic plug. Further characteristics of this material will be described hereinafter. Secondly, it comprises such a plastic plug, and, thirdly, it comprises a method of utilizing such plug to plug a hole in a wall, or the like, and securing a screw, nail or like securing means to the wall by inserting it into such plug when positioned.

Tubular wall-plugs adapted to be inserted as rigid units into holes in walls for the reception of screws are known; such plugs are usually formed of jute or like fibre (although it has been proposed to form them of other materials) and depend for their utility on their expansion by the entering screw. In many situations such plugs are not desirable owing to the friable nature of the wall or owing to dampness or heat which soon renders the plugs loose and unfit for use. Moreover, any such plug requires a hole in the wall of a size not above a certain maximum; the making of such holes is not easy when the material into which the plug is to be inserted is of a friable nature and often results in the defacing of the surface and the breaking away of pieces, which damage has to be made good by cementing.

An object of the present invention is the provision of improved means and process whereby the undesirable features referred to will be obviated and the use of a pre-formed wallplug of rigid construction avoided, the invention enabling screws or nails of all ordinary sizes to be easily, conveniently and securely fixed in a hole in a wall or the like, provided that the hole is large enough to receive the screw or nail that is to be used.

The invention provides for the attainment of this object by the provision of a mixture of materials particularly adapted to become plastic when moistened with water, and to be rolled into a plug which can conveniently be pushed into the hole in a plastic state, will subsequently set hard, is adapted to bind with the material of most walls, and will receive and retain a screw or nail while plastic or can, after setting, be bored to receive a screw or the like. Other objects of my invention comprise the provision of improved materials, and methods employing the same, having various characteristics and advantages, as will now be described.

According to the invention, there is provided a mixture comprising an intimately mixed dry mass of fibres, a powdered cementitious material, and a powdered substance capable of acting as a temporary binder to hold the mass together in a coherent plastic mass, when the mass is wetted with water, one or more filling materials also being advantageously added. The temporary binder ensures that the plastic mass can be rolled to shape, as between the hands, to form a plug, while the cementitious material ensures that it will subsequently harden to a solid mass.

The fibres employed may be of animal or vegetable origin but are preferably of mineral origin. Suitable fibres are hair, jute, hemp, flax, cotton, a metal wool and asbestos, the last-mentioned being the most suitable as it is practically indestructible and does not expand or contract upon variation in its moisture content. Other reasons why the use of asbestos is particularly desirable will be given hereinafter. The fibres used should be of appreciable length, as distinguished from fibrous material in granular, or finely divided condition.

The material for causing the final setting of the mass to solidity is preferably a cement that will cause the mixture to set to final hardness after a number of hours, as hereinafter explained. The temporary binding material may be a cereal flour, preferably wheat flour, or other starchy material, which will hold the plastic material together while it is being manipulated, as explained hereafter. Various filling materials may be incorporated, such as brick dust, pumice powder, bath brick powder or other fine granular material. The liquid medium for moistening the dry mixture is preferably water, which may in some cases advantageously contain a solution or suspension of other substances, such as a suspension of plaster of Paris.

With the mixture described above the liquid for moistening the same is usually water, and since this is readily obtainable by the individuals who are to use the mixture and practise the process, the mixture is preferably supplied in the dry state. It is then desirable that the dry mass be tightly packed in suitable containers during its transport, in order to avoid unmixing or separation of its constituents due to vibration or the like.

The fibres employed in the mixtures according to this invention may be of various lengths but it is preferred that at least some of the fibres be comparatively long, for example, about 1½" in length.

Furthermore, as a general rule, the fibres should predominate in bulk over the remaining constituents of the mixtures.

In order that the nature of the invention may be clearly understood, there will now be described some typical but non-limitative examples of the way in which it may be carried into effect, reference being made to the accompanying illustrative drawing, in which:—

The preferred mixture for use in preparing plastic wall-plugs according to the invention, and the one which is most generally applicable, comprises an intimate mixture of asbestos fibre, bath-brick powder, flour and cement, preferably a cement which will cause the mixture to set to reasonable hardness, after it has been moistened with water, within about four hours and to approximately final hardness within about twenty hours.

Such a mixture is prepared by intimately mixing the constituents in the following proportions:—

| | Pounds |
|---|---|
| Short asbestos fibres (about ½" long) | 24 |
| Medium asbestos fibres (about 1" long) | 4 |
| Long asbestos fibres (about 1½" long) | 4½ |
| Plain wheat flour | 13 |
| Medium-grade bath-brick powder | 17½ |
| White cement | 49 |

The product is a dry mass which is supplied to the user in the dry state.

Figure 1:
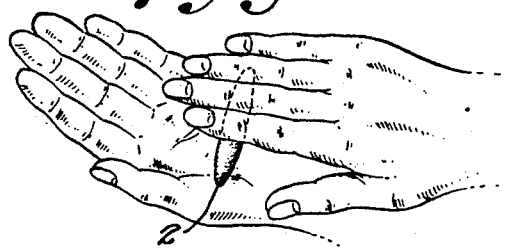
Fig. 1 shows a plastic plug in process of formation by rolling between the hands.
Figure 2:
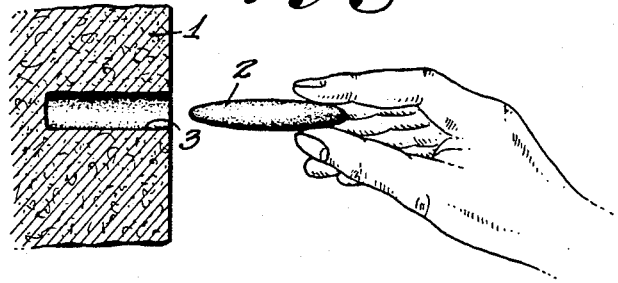
Fig. 2 illustrates the operation of inserting the plug into a prepared hole in a wall, shown in vertical section.
Figure 3:
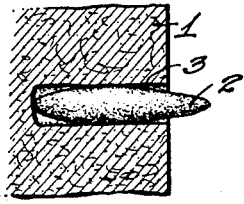
Fig. 3 shows the plastic plug in place in the hole.
Figure 5:
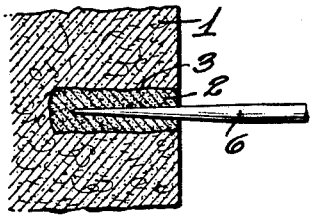
Fig. 5 illustrates a piercing operation.
Figure 4:
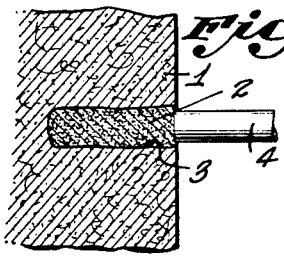
Fig. 4 illustrates the plug after it has been pressed compactly into the hole.
Figure 6:
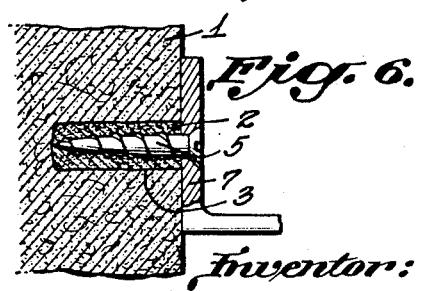
Fig. 6 is a sectional elevation showing a fixture secured to the wall by a screw engaged in a plastic plug according to the invention.

In use, some of the dry mixture has water added to it sufficient to convert it into a coherent plastic mass that can be rolled between the hands (as illustrated in Fig. 1). When plugging a wall I (Fig. 2) to provide a hold for a screw, the plastic mass is rolled to substantially cylindrical form as indicated at 2 in Fig. 1 and the plastic plug 2 is inserted endwise into a prepared hole 3 as shown in Figs. 2 and 3, preferably being pressed compactly thereinto as by means of a blunt tool or implement 4 as illustrated in Fig. 4, to fill the hole completely and conform to the contours of the wall of the hole 3. As the plug 2 hardens it cements itself to the surrounding material with which when set it is thoroughly united, if the hole 3 is in a usual wall. The screw 5 (Fig. 6) may be inserted into the plug 2 while this is still plastic, the plug 2 preferably being pierced with a sharp instrument 6 first as illustrated in Fig. 5, in which case the screw 5 forms its own thread, or the plug 2 may be allowed to harden before the insertion of the screw. In the latter case the plug 2 may be pierced while plastic to prepare a bore for the reception of the screw 5 or the plug may be drilled after hardening; then the screw is inserted into the bore and will cut its own thread as in wood. In Fig. 6, 7 indicates a bracket fixture which has been secured to the wall I by means of the screw 5.

The hole 3 initially formed in the wall should preferably be but slightly larger in diameter than the screw 5 as, for example, by about $\frac{1}{16}$ to $\frac{1}{8}$ of an inch in the case of the more commonly used sizes of wood screws; this ensures the maximum holding power with the use of the minimum quantity of the plastic mass. In such circumstances the screw when inserted into the plastic mass is immediately capable of supporting a heavy load.

Holes which are comparatively large in diameter relatively to the screws to be fixed therein have, however, been satisfactorily plugged with the plastic mixture and had the screws inserted immediately, the screws being capable of supporting light loads directly after their insertion.

The plugs produced from the mixture specified, when set, are waterproof and, for practical purposes, unaffected by heat, acids or alkalies; they can be used with ordinary screws, drive screws, screw nails, or coach screws; they can be used not only with masonry and plaster, but with tiles and porcelain, without danger of splitting and they will, even if they do not bind as intimately with these latter as with brick walls, yet bind sufficiently strongly for practical purposes. The plugs can be carried by a workman in plastic form for an hour or more and yet remain usable. The screw may, before or after the plug has set, be removed, leaving a perfect thread in the material of the plug which is not detached from masonry by such removal. The plastic plug of the present invention permits of screws being used in conjunction with frail substances, as its holding power is not obtained by mere friction due to expansion of the material of the plug by insertion of the screws but mainly by the interlocking of the mass with the irregularities in the surface of the wall of the hole.

It should be noted that the plastic mass from which the plugs are shaped can be and usually is prepared by the addition to the dry mixture referred to above of a slightly larger quantity of water than is necessary to ensure setting of the cement and that the plastic mass thus prepared, while being coherent and capable of being rolled to shape, does not set hard as rapidly as it would if slightly less water had been added. This feature is of advantage in that it enables a supply of the plastic mass to be prepared in advance and carried, preferably in a substantially airtight box, throughout the working day in readiness for wall-plugging or like purposes. Due to the insertion of a screw or the like into a plug made by using such a plastic mass some or all of the excess moisture is expressed from the mass and the hardening of the mass is thereby accelerated.

When the mixture of asbestos fibre, bath-brick powder, flour and cement is for use in certain applications, such as for securing into an electrical insulator the central screw, pillar, stud or bracket by which the insulator is secured to a post or the like, it is preferred to increase the proportion of cement in the mixture.

An example of a suitable mixture for this purpose is asbestos fibres varying, for example, from ½" to 1½" long, 20% by weight, bath-brick powder, 10% by weight, flour 7% by weight, and cement, 63% by weight.

This mixture is sufficiently elastic when set to take up expansions and contractions of an insulator due to change of temperature.

The mixtures referred to above in which ordinary cement is employed must also have incorporated therein, as has been previously stated, a certain proportion of a substance which will act as a temporary binder while the mixture is being manipulated in the plastic state, this being necessary in order to prevent disintegration of the mass. A suitable substance is the plain wheat-flour included in the mixtures specified but other cereal flours, starches or the like may be used. With the mixtures indicated in the above examples, the plastic material can be readily rolled to shape between the hands, without soiling or sticking to the hands, and the plastic plug thus formed is sufficiently cohesive so that it can be picked up by one end, for insertion in the hole. If, however, the temporary binding material is omitted, the wet mixture will not be sufficiently cohesive to permit the necessary manipulation in forming the plug, and it will be difficult to press the loose crumbly mass into the hole.

Certain of the advantages of the invention may be obtained by less universally applicable mixtures than the asbestos fibre, bath-brick, flour and cement type of mixture.

For example, if a rapidly hardening plastic be desired plaster of Paris may be used in place of cement. Alternatively, the dry mixtures containing cement may be moistened with a thick aqueous suspension of plaster of Paris.

It will be noted that rolling the plastic mixture as described will cause the fibres to all assume a more or less parallel position, lengthwise of the plug. When a screw is inserted and screwed into the plug, while the plug is still in plastic condition, the fibres will not be cut by the screw-thread, but some of them will be bent sidewise thereby, and will form part of the surface of the female screw-thread thus formed, while some of the outermost fibres, being deformed outwardly, will press against the surface of the wall of the hole, and aid in the interlocking of the plastic mass with the irregularities of that surface. The fibres are, of course, also pressed outwardly when a nail is driven into the plug, to aid in interlocking the mass with the wall. For the above reasons it is particularly advantageous to insert a screw while the mass is still plastic. It may also be observed that asbestos has been found to be by far the most advantageous fibre to use because, among other reasons, of the excellence of the screw-thread formed in the plastic mass by screwing a screw therein, and the firmness of the bond with the wall, when asbestos is used.

It may also be observed that the insertion of a screw or nail into the plastic plug causes little or no extrusion of the plastic mass from the hole, although it does express some of the water therefrom, either out of the hole, or into the wall. It will be noted that the temporary binder must be used in sufficient proportion to cause sufficient cohesion of the proportions, of cement, asbestos or other materials used, during manipulation, as can be readily determined.

What I claim is:—

1. A method of securing screws, nails and like securing means in prepared holes in walls and the like which consists in preparing a mixture of fibres, a powdered material capable of setting to a hard mass when moistened with a liquid medium and a further powdered material capable of acting as a binder when moistened with the same liquid medium, moistening the said mixture with the liquid medium to produce a coherent plastic mass, shaping the plastic mass into a plug, inserting the plastic plug thus obtained into the hole and inserting the securing means into the plug.

2. A method of securing screws, nails and like securing means in prepared holes in walls and the like which consists in preparing a mixture of asbestos fibres, powdered cement and cereal flour, moistening the mixture with water to produce a coherent plastic mass, shaping the mass into a plug, inserting the plastic plug into the hole and inserting the securing means into the plug.

3. For use in plugging a wall to provide a hold for a securing means such as a screw, a plastic plug formed from a mixture of fibres, powdered cement and wheat flour moistened with water.

4. A plastic plug for use in plugging a wall to provide a hold for a securing means such as a screw, said plug being formed from a mixture of asbestos fibres, powdered cement and a starchy material, moistened with water, said starchy material being adapted to bind the mass together, when wet, in cohesive plastic condition.

5. A method of securing screws, nails and like securing means in prepared holes in walls and the like which consists in preparing a mixture of fibres, a powdered material capable of setting to a hard mass when moistened with a liquid medium and a further powdered material capable of acting as a binder when moistened with the same liquid medium, moistening the said mixture with the liquid medium to produce a coherent plastic mass, shaping the plastic mass into a plug, inserting the plastic plug thus obtained into the hole and inserting the securing means into the plug while the plug is still soft and plastic.

6. A material for the formation of a plastic plug for use in plugging a wall to provide a hold for a securing means such as a screw, comprising a mixture of fibres of appreciable length, powdered cement, and a powdered substance capable of acting as a temporary binder to hold the mass together in a cohesive plastic condition when moistened.

7. A material for the formation of a plastic plug for use in plugging a wall to provide a hold for a securing means such as a screw, comprising a mixture of fibres of appreciable length, a powdered cementitious material, and a powdered starchy material, the latter being capable of temporarily binding the mass in cohesive plastic condition, when wetted, and said cementitious material being adapted to cause the subsequent hardening of the mass to a solid condition.

8. A material for the formation of a plastic plug for use in plugging a wall to provide a hold for a securing means such as a screw, comprising a mixture of fibres of appreciable length, powdered cement, and a powdered cereal flour, capable of acting as a temporary binder to hold the mass together in cohesive plastic condition, when moistened with water.

9. A material for the formation of a plastic plug for use in plugging a wall to provide a hold for a securing means such as a screw, comprising a dry mixture of asbestos fibres, powdered cement and a powdered starchy material, capable of acting as a temporary binder to hold the mass together in cohesive plastic condition when moistened with water.

10. A material for the formation of a plastic plug for use in plugging a wall to provide a hold for a securing means such as a screw, comprising a mixture of fibres of appreciable length, powdered cement, a powdered substance capable of acting as a temporary binder to hold the mass together in cohesive plastic condition when moistened, and a powdered filling material.

NOEL PHILLIPS.